United States Patent
Wang et al.

(10) Patent No.: US 10,264,096 B2
(45) Date of Patent: Apr. 16, 2019

(54) DEPICTING ATTRIBUTES OF CONNECTIONS IN A SOCIAL NETWORK

(71) Applicant: LinkedIn Corporation, Mountain View, CA (US)

(72) Inventors: Guan Wang, San Jose, CA (US); Huan V. Hoang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 14/663,107

(22) Filed: Mar. 19, 2015

(65) Prior Publication Data
US 2016/0277527 A1    Sep. 22, 2016

(51) Int. Cl.
*H04L 29/08* (2006.01)
*G06N 99/00* (2019.01)
*G06Q 50/00* (2012.01)

(52) U.S. Cl.
CPC .......... *H04L 67/306* (2013.01); *G06N 99/005* (2013.01); *G06Q 50/01* (2013.01)

(58) Field of Classification Search
CPC ... H04L 67/00–67/42; G06Q 10/00–10/06398; G06Q 30/02–30/0284; G06Q 50/00–50/01; G06N 99/00–99/005
See application file for complete search history.

(56) References Cited

U.S. PATENT DOCUMENTS

| | | | | |
|---|---|---|---|---|
| 2009/0248599 A1* | 10/2009 | Hueter | ............... | G06Q 10/00 706/20 |
| 2013/0159115 A1* | 6/2013 | Adams | ............... | G06Q 50/01 705/14.66 |
| 2013/0212479 A1* | 8/2013 | Willis | ............... | G06Q 10/10 715/736 |
| 2014/0025702 A1* | 1/2014 | Curtiss | ............... | G06Q 50/01 707/769 |
| 2014/0245163 A1* | 8/2014 | Mubarek | ............... | G06Q 50/01 715/738 |
| 2014/0279720 A1* | 9/2014 | Bhatia | ............... | G06N 5/04 706/11 |
| 2016/0119615 A1* | 4/2016 | Chang | ............... | G06T 19/00 348/51 |

* cited by examiner

*Primary Examiner* — Clayton R Williams
(74) *Attorney, Agent, or Firm* — Park, Vaughan, Fleming & Dowler LLP

(57) ABSTRACT

A system, method, and apparatus are provided for depicting attributes of a user's or member's connections within a professional or social network, in a manner that enables insight into the nature of the connections. When insight into a first member's connections is to be depicted, one or more attributes of first-degree connections (i.e., direct connections) and/or other connections are retrieved (e.g., employer or associated organization, function or role, seniority, skill (s)), over all time or some threshold period of time into the past. The values for the attributes are aggregated over the examined connections, and some or all values are displayed with one or more visual characteristics (e.g., size, color) that indicate a frequency or commonness of the values among the connections. The system or apparatus may include a user interface through which the depiction is presented in place of or in addition to a display of the connections.

23 Claims, 3 Drawing Sheets

US 10,264,096 B2

DEPICTING ATTRIBUTES OF CONNECTIONS IN A SOCIAL NETWORK

BACKGROUND

This disclosure relates to the field of computer systems. More particularly, a system, apparatus, and method are provided for providing insight into one's connections within a community such as a professional social network.

A typical view of a user's personal and/or professional connections (e.g., with other people) lists or identifies the individual connections in some way (e.g., by name, with pictures). Such a view usually provides little value to the user, because they are typically well aware of who they know, especially the connections with whom they interact most, and gives little or no insight into the connections.

In order to obtain more useful information regarding the community of users to whom they are connected, a given user generally must open a view of each individual connection and navigate to find information such as where they went to school, the organizations to which they belong, and so on. There usually is no facile manner of viewing one's connections in terms of a desired attribute or piece of information (e.g., schools, organizations).

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a network of connections (e.g., professional connections, social connections) of a user (e.g., a person, an organization) is manipulated to provide a view of those connections via a filter that allows that user or some other person or organization to view the connections in terms of one or more attributes associated with the filter. In these embodiments, the connections are persons (and/or perhaps organizations), and the network may be a social network or a professional network, such as that provided by LinkedIn® Corporation.

For example, a filter may apply to attributes such as employer (or other organization affiliated with or associated with a connection), function or functional area (e.g., job title, duties, responsibilities, role(s)), seniority level with an employer or organization, skill(s) (e.g., primary skill, the skill for which the connection has been endorsed most), a status (e.g., as a VIP or very important person), industry, and so on, and provide a viewer with corresponding insight to the target user (i.e., the user whose connections have been examined).

Figure 1:
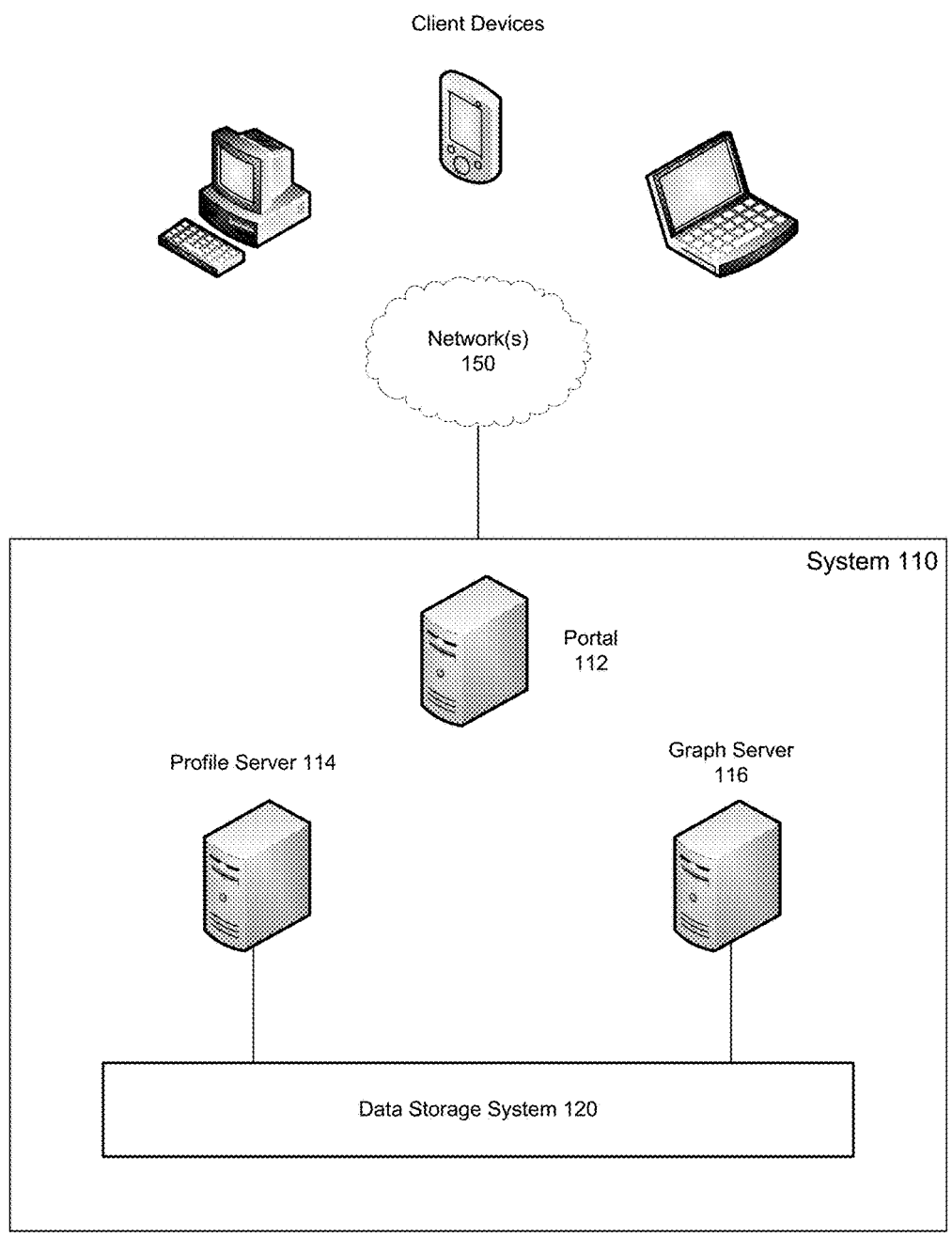
FIG. 1 is a block diagram depicting an environment in which a user's connections are depicted in an insightful manner, in accordance with some embodiments.

FIG. 1 is a block diagram depicting an environment in which a user's connections within a community are depicted in an insightful manner, according to some embodiments.

System 110 of FIG. 1 is (or is part of) a data center that supports or hosts an online application or service that features a community or network of users, such as a social network or a professional network. Users of system 110 may be termed members because they may be required to register with the system in order to use the application or service. Members may be identified and differentiated by username, electronic mail address, telephone number, and/or some other unique identifier.

Users/members of a service or services hosted by system 110 connect to the system via client devices, which may be stationary (e.g., desktop computer, workstation) or mobile (e.g., smart phone, tablet computer, laptop computer). In order to interact with the system (e.g., to view content, submit or edit content) the client devices operate suitable client applications, such as a browser program or an application designed specifically to access a service offered by system 110.

Client devices are coupled to system 110 via direct channels and/or one or more networks 150 or other shared channels, which may include the Internet, intranets, and/or other networks, and may incorporate wired and/or wireless communication links.

Interactive user/member sessions are generally made through portal 112, which may comprise an application server, a web server, and/or some other gateway or entry point. The portal through which a given session is established may depend on the member's device or method of connection. For example, a user of a mobile client device may connect to system 110 via a different portal (or set of portals) than a user of a desktop or workstation computer.

System 110 also includes profile server 114, graph server 116, and data storage system 120, which may be a distributed data storage system. Data storage system 120 and/or components of the data storage system (e.g., separate storage engines) include appropriate data storage devices (e.g., disks, solid-state drives).

Profile server 114 maintains profiles of members of the service(s) hosted by system 110, which may be stored in data storage system 120 and/or elsewhere. An individual member's profile may include or reflect any number of attributes or characteristics of the member, including personal (e.g., gender, age or age range, interests, hobbies, member ID), professional (e.g., employment status, job title, employer or associated organization, industry, functional area or role, skills, endorsements, professional awards), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify who sent a message, to identify a recipient of a status update, to select content to serve to the member or an associated member, to record a content-delivery event, to provide insight regarding the member's connections). Some or all profile data of a member may be retained permanently or for a long period of time.

Organizations may also be members of the service (i.e., in addition to individuals), and may have associated descriptions or profiles comprising attributes such as industry (e.g., information technology, manufacturing, finance), size, location, goal, etc. An organization may be a company, a corporation, a partnership, a firm, a government agency or entity, a not-for-profit entity, a group or collection of associated members, or some other entity formed for virtually any purpose (e.g., professional, social, educational). Either or both organizations and individual members may "follow" and/or be followed by other members.

Graph server 116 maintains a graph representing the user/member community or communities that make use of services offered by system 110. The graph may be stored within data storage system 120 and/or elsewhere. Within the graph, nodes represent members (either or both individual members and organizations) and are coupled to other nodes via edges. Nodes have attributes (and values for those attributes) corresponding to the members they represent, and an edge may also have attributes related to the connection it represents between two members (e.g., when the members were connected, how they were connected, a strength of the connection). The network of members of a service offered by system 110 may illustratively number in the tens or hundreds of millions.

System 110 may include other components not illustrated in FIG. 1. For example, in some embodiments, system 110 includes a content server that maintains content items for serving to members, an index of the content items, a module for recommending content to serve to a given member, and/or other information useful in serving content to members. System 110 may also include a tracking server that monitors and records activity of system 110 and/or members regarding what is served, to whom (e.g., which member), and when it was served, and that may receive notifications of member actions regarding content, and/or other entities.

Content items published or served by system 110 may include content generated by members and/or content supplied by third parties. Such content may include messages, advertisements, offers, announcements, job listings, news, informative articles, member activities, and so on, and may be or may include any type of media (e.g., text, graphics, image, video, audio).

Members of a service hosted by system 110 have corresponding pages (e.g., web pages, content pages) on the system, which they may use to facilitate their activities with the system and with each other, to form connections/relationships with other members, to view their connections and/or information regarding their connections, to review their profiles, to inform friends and/or colleagues of developments in their lives/careers, etc. These pages (or information provided to members via these pages) are available to some or all other members. Members' pages may be stored within data storage system 120 or elsewhere.

Functionality attributed herein to system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of portal 112, profile server 114, and graph server 116 may alternatively be implemented as separate software modules executing on one or more computer servers. Thus, although only a single instance of a particular component of system 110 may be illustrated in FIG. 1, it should be understood that multiple instances of some or all components may be utilized.

In some embodiments, when a member desires to see or review his or her connections within the member community, or when one member views another member's connections, the viewing member is provided with a visual depiction that reveals insights into the target member's connections. For example, the depiction may reflect the commonness, magnitude, or frequency of occurrence of one or more attribute values among the member's connections. Embodiments described herein depict the member's first-degree connections (i.e., other members directly connected to the member by one hop of the graph), but other embodiments may be implemented to depict connections at some other level(s) or degree(s) of connectedness (e.g., third degree, first and second degrees). A depiction offering connection insights may be presented in place of or in addition to a simple listing of the member's connections, which offers no such insight.

Virtually any attribute(s) may be included in the insightful depiction. However, in some implementations, separate depictions are assembled and presented for each attribute. In these depictions, the size, color, font, brightness, orientation, and/or some other aspect or characteristic of the display of an attribute value indicates or corresponds to the quantity of first-degree connections who have (or had) that attribute value.

For example, if the depiction is intended to provide insight into the functions of the first-degree connections, which may alternatively be characterized as jobs, roles, titles, or something similar, each value for that attribute found among the target member's first-degree connections' profiles may be displayed with a font size proportional to how common that value is among the target's first-degree connections.

In some implementations, only the connections' current values for the selected attribute(s) are aggregated and depicted. In other implementations, values that were associated with a connection during some period of time (e.g., the past 5 years, the past 10 years), or possibly all values ever associated with a connection, may be aggregated and depicted. For this purpose, data storage system 120 of FIG. 1, or some other component (e.g., an archive or long-term repository not shown in FIG. 1), may retain attributes of members' profiles for a relatively long period of time.

Besides function, other illustrative attributes that may be depicted include employer (or an associated organization), seniority (within a function, job, or role), skill, level of education, age, and so on. A depiction may also, or instead, reveal statuses of the target member's connections, perhaps by identifying one or more VIPs (very important persons) among those members (if any are VIPs), identifying the N (N≥1) most important connections, identifying the N connections with the closest connections to VIPs or other important persons, etc.

In different implementations, "importance" may have different connotations. For example, a person's importance may be proportional to how influential, prominent, famous, or well-known he or she is. Thus, an "influencer," a member of the community that has a particularly large number of followers, subscribers, or connections, may have higher importance than people with fewer followers or connections. Also, a celebrity, sports star, or other well-known person may be considered important.

Further, a politician may be important, a member employed by or closely associated with a famous organization (or an organization that has many followers) may be important, leading scientists and pre-eminent personalities in various fields may be important, and so on.

Thresholds may be applied to determine whether a given member is important, or to assign a level of importance. For example, a politician may need to be elected at the state level or higher, or to some position (e.g., state governor) or higher.

As another example, before being considered a celebrity or otherwise famous or important, a person may need to be mentioned a threshold number of times in publications (e.g., magazines, blogs, news stories) during some time interval (e.g., one week, one month). As yet another example, in order for a person to derive a level of importance from his or her employer or affiliated organization, that organization may need to be within the top X organizations (X≥1) in terms of followers (e.g., within the member community) or other metric, or within the top Y % of organizations in terms of followers or some other metric, and he or she may need to hold some minimum level function or role (e.g., vice president, CXO, director).

In some embodiments, multiple snapshots may be captured, over time, regarding insights into a given member's connections. The snapshots may illustrate evolution of the member or the member's connections as he or she progresses through his or her career, for example. Over time, a pattern may emerge reflecting the evolution of people who achieve some threshold level of success, wherein success may be indicated by achieving some minimum level within an organization, by founding a profitable company, by obtaining some threshold number of followers, etc.

Insightful snapshots of successful members' connections may be used to train a machine-learning model that can then be applied to identify other persons who are likely to achieve success. Then, after snapshots are assembled for a given target member, the model may be applied to determine whether that member is or is not likely to attain a particular level of success.

As another example, snapshots of connection insights for members who became successful entrepreneurs may be used to train a model to recognize connection evolutions indicative of successful entrepreneurs. Another member who exhibits a similar pattern of evolution in his or her connections may be likely to also become a successful entrepreneur.

In general, a person's career follows a dynamic path, and his or her past career status can be used to predict his or her future. For example, if one person at a "senior manager" seniority level has a connection pattern which outclasses most other senior managers, she may have an advantage in her later career. Or, a founder of a very promising startup company who exhibited significantly better connection patterns over his peers 5 years ago may hold a competitive edge and make him very successful today.

Figure 2:
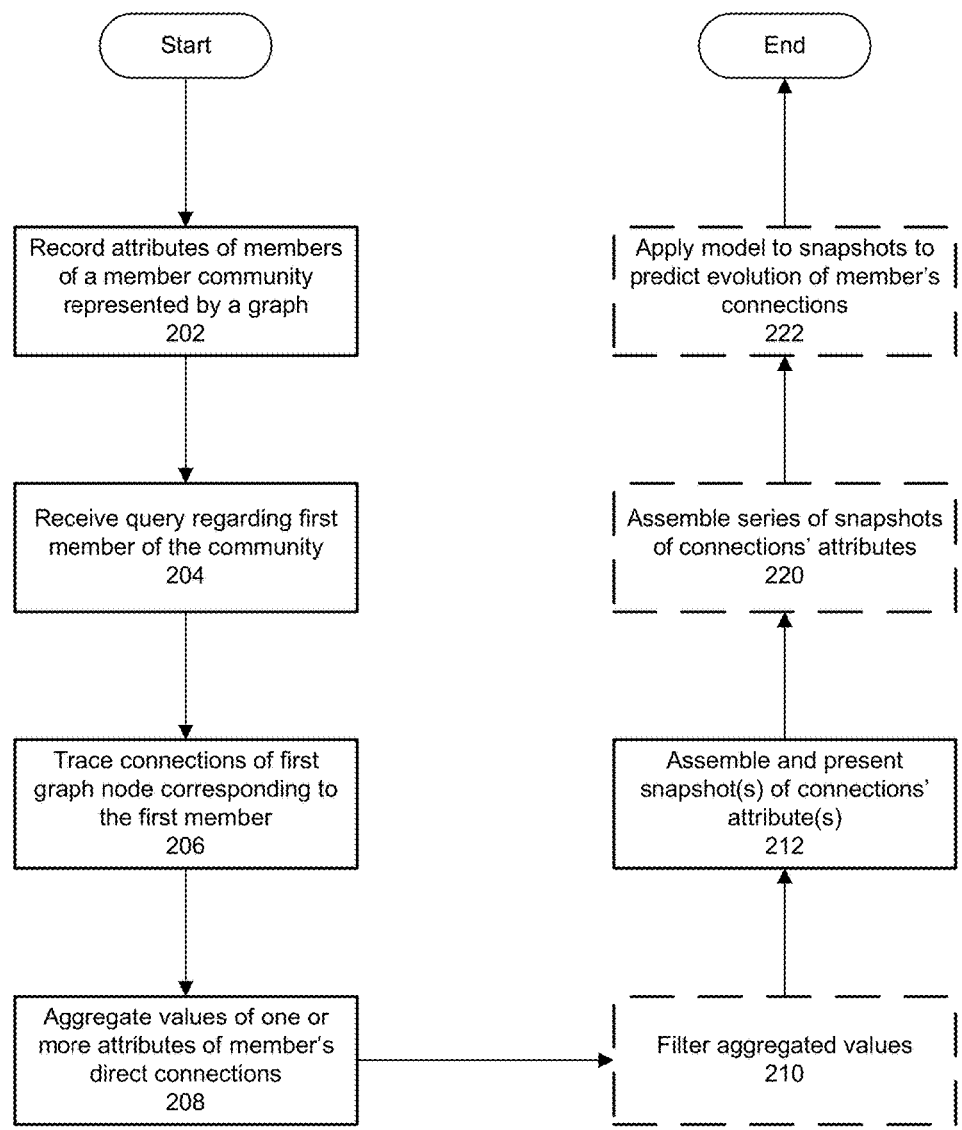
FIG. 2 is a flow chart illustrating a method of depicting a user's connections, in accordance with some embodiments.

FIG. 2 is a flow chart illustrating a method of depicting a user's connections within a user community, with insight, according to some embodiments. In one or more embodiments, one or more of the operations may be omitted, repeated, and/or performed in a different order. Accordingly, the specific arrangement of steps shown in FIG. 2 should not be construed as limiting the scope of the embodiments.

In operation 202, attributes of members of the user/member community are recorded and retained for some period of time, which may be relatively lengthy. For example, values of member attributes for which insightful views are to be offered or available may be recorded each time the value of such an attribute changes. As a result, some or all values for a given attribute of a given member may be available for a long period of time, as discrete data and/or as part of a snapshot of attribute values of a given member's connections.

In operation 204, a query is received that requires or warrants production of an insightful view of attributes of the direct (i.e., first-degree) connections of a target member or first member of the member community. Illustratively, the query may have been initiated when the target member logged in, when the target member or some other member requested a depiction of the target member's connections, or as a result of some other action.

In other embodiments, an insightful view or depiction may be constructed for indirect connections, such as second-degree, third-degree, or more distant connections.

In operation 206, a graph representing the member community is searched or traversed to identify some or all direct connections of the target member. The search may be limited to nodes that represent individual members (i.e., and omit nodes representing organizational members) if the query specifies such a limitation or if the insightful view that is desired targets attributes that only individual members possess (e.g., education, function, seniority). Conversely, individual members' nodes may be omitted if the target attributes are possessed only by organizations (e.g., size, number of employees). In some implementations, the target attributes are possessed by both individual and organizational members, in which case no nodes may be omitted. Nodes associated with bogus, fictitious, or otherwise invalid members may be ignored, however, or marked.

In operation 208, values of the target attribute(s) are extracted from the nodes searched or traced in operation 206, and are aggregated. Thus, for each attribute for which insight is to be offered or depicted, the first-degree connections' values are accumulated.

In the illustrated embodiment, the direct connections' profile data that is examined includes a default period of time (e.g., 5 years into the past) or a default number of generations (e.g., last 3 values for a particular attribute (or possibly all values if less than 3 have been used)), and values assigned to the target attributes during the specified period of time or for the specified number of generations are accumulated. In other embodiments, some or all values for one or more target attributes (e.g., over all time, over some or all generations) are aggregated. In yet other embodiments, only current values for target attributes are aggregated.

In optional operation 210, some values may be discarded or filtered out from further processing. For example, null values and values that are clearly erroneous or that contain undesired content (e.g., vulgarities, obscenities, invalid values) may be omitted. If a collection of acceptable, valid, or known values for a given attribute is available (e.g., functions/roles/jobs, educational institutions), a value found in a connection's profile that is not in the collection may be discarded.

In some implementations, however, in which one or more connections' profiles do not include values for a target attribute, a placeholder value such as "unknown," "not provided," or something similar may be used.

Yet further, some special processing may be applied to specific attributes. For example, when insight is to be offered or made available into the employers (or associated organizations) of the target member's connections, the name/value of the target member's own employer may be omitted from the aggregated values. It may be expected that most of a target member's connections (especially professional connections) may have the same employer value and, by omitting that employer from the insightful depiction, it will be easier to view the target member's connections outside of his or her own employer. The target member's employer need not be omitted in all implementations, however, such as if that employer value is not the most common employer value among the target member's direct connections.

In some embodiments, such as when a large number of values exist among the connections, less-represented or less-common values may be omitted by filtering out all but the top X values or the top Y % of values (X, Y≥1).

In operation 212, an insightful snapshot of the target member's connections is assembled and presented in response to the query, in terms of the one or more target attributes. As described above, values of the target attributes of the target member's direct or first-degree connections that have not been filtered out are presented. At least one visual characteristic or aspect of each value (e.g., size, color, position) within the visual depiction is configured to reflect the number or percentage of the direct connections that have that value for the associated attribute.

A separate insightful visual depiction may be assembled and presented for each target attribute. In some implementations, however, two or more attributes may be depicted jointly. For example, a merged depiction of function and employer attributes may provide views of multiple combinations of the two attributes so that one can see not only where the direct connections work (i.e., employer), but also their duties (i.e., function).

In some embodiments, the viewer of the insightful depiction may obtain a list of members having a given value by selecting (e.g., clicking on) the value, may be able to see the numbers or percentages of connections having one or more values, may be able to restrict the time-range reflected by the values (e.g., to see a view reflecting only the connections' current values, to see only connections' current and immediately antecedent values), or may be able to access other related or relevant information.

Also, in some embodiments, an insightful visual depiction that is assembled and presented requires other processing in addition to or instead of aggregating values of direct connections' attributes. For example, a depiction of how closely connected the target member is to "important" or "very important" people or members may require determination of whether a particular connection (e.g., an individual or organization) is important.

As discussed above, a given member's profile may in some circumstances indicate that the member is important or very important, such as if his or her function is Governor (of a state), US Congressman or Senator, CXO of a Fortune 500 corporation or of an organization that has a very large number of followers, etc. Even if a given member's profile attributes (e.g., function, employer, seniority, other) do not inherently indicate that he or she is "important," a tool may be applied to measure his or her prominence (e.g., in a particular field or industry), to determine whether he or she has been mentioned a minimum number of times within publications (e.g., news publications, sports publications, technical publications), to determine whether he or she is closely associated with a famous or important organization or project, etc.

For example, interfacing with news providers and/or other publishers may facilitate determinations of whether a particular connection is "important" based on his or her mention in publications. In general, various rules or guides may be assembled for different fields (e.g., business, government, education, science) to determine whether someone is "important" in a field. In addition, some VIPs could be manually identified, and then a machine learning model trained from their profiles to identify other VIPs.

In optional operation 220, the new snapshot (of operation 212) and one or more previous snapshots of the target member's direct connections are obtained. Each time a snapshot is generated, for example, it may be retained. In some implementations, one snapshot may be retained every default interval of time (e.g., 3 months, 6 months, 1 year), which may require automatic generation of a particular snapshot (without displaying it) if no query for an insightful view of the target member's connections is received during a particular interval.

In operation 222, a machine-learning model is applied to the assembled snapshots. The model may function to yield a binary indication (e.g., true, false) as to whether the target member's connections are likely to evolve in a manner learned by the model (e.g., a pattern indicative of successful entrepreneurship, a pattern indicative of attaining a CXO position within a multi-national corporation), may function to output a forecast of the target member's connections (in terms of the target attributes) at some time in the future, or may function to produce other output.

After operation 222, the method ends.

Figure 3:
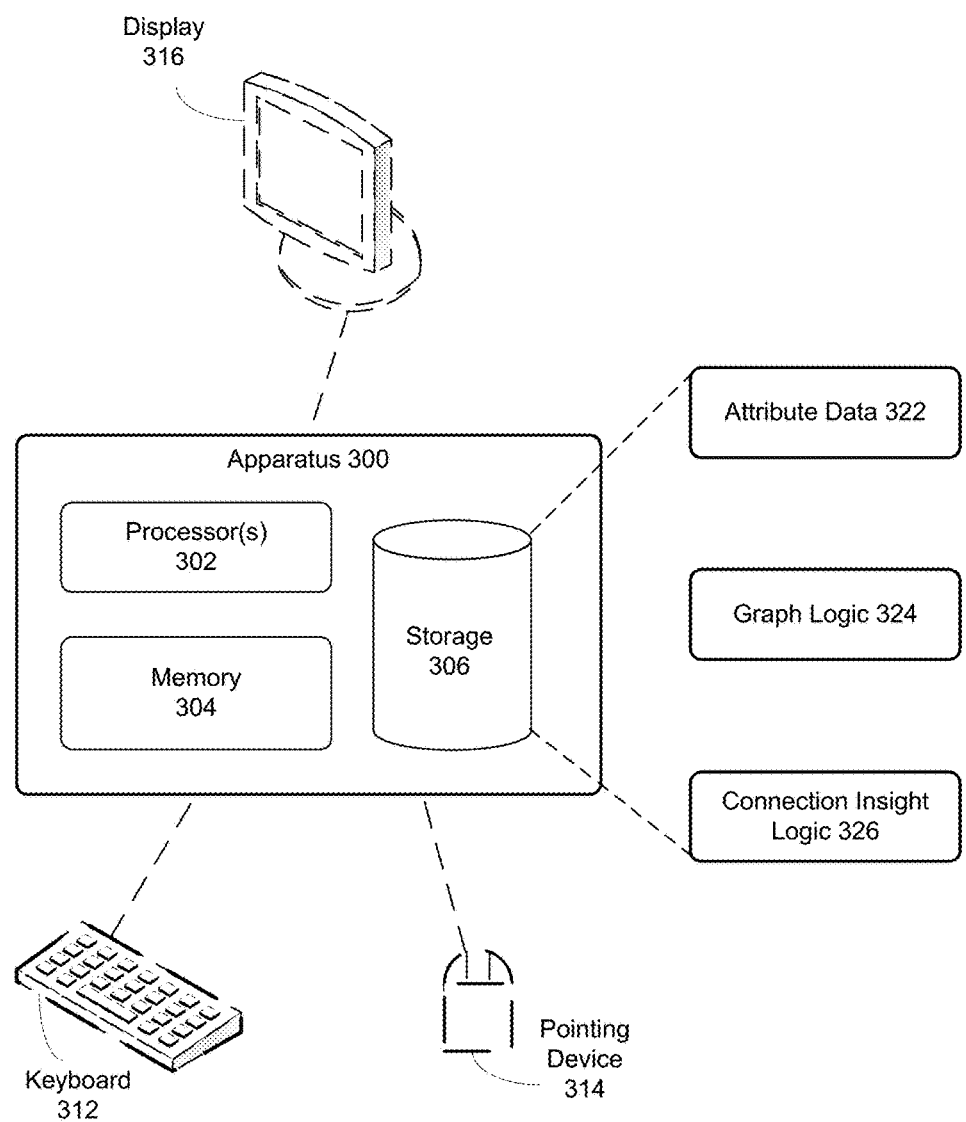
FIG. 3 depicts an apparatus for depicting a user's connections in an insightful manner, in accordance with some embodiments.

FIG. 3 is a block diagram of an apparatus for providing an insightful visual depiction of a user's connections, according to some embodiments.

Apparatus 300 of FIG. 3 includes processor(s) 302, memory 304, and storage 306, which may comprise one or more optical, solid-state, and/or magnetic storage components. Storage 306 may be local or remote to the apparatus. Apparatus 300 can be coupled (permanently or temporarily) to keyboard 312, pointing device 314, and display 316.

Multiple apparatuses 300 may store related or associated data, and may cooperate to handle and apply data queries and manipulations, including read and write operations. In particular, apparatus 300 stores attribute data 302 of members of a user/member community (e.g., a professional or social network), possibly as part of the members' profiles within the community. The attributes may include professional, personal, social, educational, and/or other types of information, and any number of members may have similar (or identical) values for the same attribute(s). Attribute data 322 may include current values for member attributes and/or previous values. Attribute data 322 may include, may be part of, or may be separate from graph data representing the member community.

In addition to attribute data 322, storage 306 also stores logic that may be loaded into memory 304 for execution by processor(s) 302. Such logic includes graph logic 324 and connection insight logic 326. In other embodiments, these logic modules may be combined or divided to aggregate or separate their functionality as desired.

Graph logic 324 comprises processor-executable instructions for manipulating and/or modifying a graph representing the member community. The graph logic thus operates to identify a target node associated with a target member, identify nodes (and members) connected or coupled to the target node (and the target member). Graph logic 324 may also generate new versions of the graph (or a portion of the graph) to reflect attributes of a given member's connections or to make it easier to give insight into those connections.

Connection insight logic 326 comprises processor-executable instructions for aggregating, correlating, analyzing, and depicting values of one or more attributes of members associated with nodes of the graph of the member community. Thus, the connection insight logic may retrieve (e.g., via graph logic 324) attribute values of some number of members, filter them as necessary, correlate the values, and present a visual depiction of the attribute values that reflects how common each displayed value is (among the members), and possibly to identify one or more "important" members.

Snapshots of insights that are used to yield insightful visual depictions into a member's connections may be stored within attribute data 322 and/or elsewhere, and may be recorded in displayable formats and/or formats that can be analyzed by logic executed by processor(s) 302 (e.g., a machine-learning model).

In some embodiments, apparatus 300 performs some or all of the functions ascribed to one or more components of system 110 of FIG. 1.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of predicting the likelihood of a member's future success in career based on attributes of the member in a social network, the method comprising:

for each successful member of a plurality of successful members of a member community, wherein each successful member has achieved a predetermined threshold level of success in his/her career, at a computer, identifying, within a graph of nodes connected by edges, a first node representing the successful member of the member community, the successful member having corresponding attribute values for attributes including one or more of employer, function, and seniority;

traversing the graph to identify, using the computer, multiple second nodes directly connected to the first node and representing multiple members of the member community directly connected to the successful member and having corresponding attribute values for the attributes; and capturing, over a time period, a set of snapshots of the attribute values corresponding to the multiple members, wherein each snapshot is captured at a given time in the time period according to a predetermined time interval;

training a machine-learning model using the captured sets of snapshots for the plurality of successful members to obtain a trained model for recognizing an evolution of the plurality of successful members;

capturing, over another time period, a set of snapshots of attribute values corresponding to multiple members directly connected to a target member of the member community; and applying the trained model to the set of snapshots of the multiple members directly connected to the target member to predict a likelihood of the target member achieving the evolution of the plurality of successful members.

2. The method of claim 1, further comprising:

ranking the multiple members based on their importance; and augmenting the graphical depiction with indicators of a top N important members among the multiple members (N ≥1).

3. The method of claim 2, wherein said ranking comprises:

identifying those members in the multiple members who are one or more of:

an influencer;

a famous person;

a prominent scientist; and an elected politician at a state level or above.

4. The method of claim 2, wherein said ranking comprises:

determining numbers of followers, among the member community, of M organizations (M ≥1); and identifying N members among the multiple members associated with the M organizations.

5. The method of claim 2, wherein said ranking comprises:

executing a third-party tool to calculate academic ratings of the multiple members.

6. The method of claim 1, wherein:

said identifying comprises receiving a query concerning the successful member; and wherein the method further comprises displaying each corresponding value for each of the attributes with a visual characteristic that depends upon the frequency of the corresponding value among the multiple members.

7. The method of claim 1, wherein the method further comprises:

identifying historical attribute values of the multiple members for a threshold period of time into the past.

8. The method of claim 1, wherein the evolution of the plurality of successful members includes a level of success achieved by the plurality of successful members over the time period.

9. The method of claim 1, wherein predicting the likelihood of the second member achieving the evolution of the plurality of successful members includes determining if the second set of snapshots exhibits a similar pattern of evolution to the modeled evolution of the plurality of successful members.

10. The method of claim 1, wherein capturing, over the time period, the set of snapshots includes taking the set of snapshots at a set of a predetermined time intervals.

11. An apparatus for predicting the likelihood of a member's future success in career based on attributes of the member in a social network, the apparatus comprising:
one or more processors; and
memory storing instructions that, when executed by the one or more processors, cause the apparatus to:
for each successful member of a plurality of successful members of a member community, wherein each successful member has achieved a predetermined threshold level of success in his/her career,
identify, within a graph of nodes connected by edges, a first node representing the successful member of the member community, the successful member having corresponding attribute values for attributes including one or more of employer, function, and seniority;
traverse the graph to identify multiple second nodes directly connected to the first node and representing multiple members of the member community directly connected to the successful member and having corresponding attribute values for the attributes; and
capture, over a time period, a set of snapshots of the attribute values corresponding to the multiple members, wherein each snapshot is captured at a given time in the time period according to a predetermined time interval;
train a machine-learning model using the captured sets of snapshots for the plurality of successful members to obtain a trained model for recognizing an evolution of the plurality of successful members;
capture, over another time period, a set of snapshots of attribute values corresponding to multiple members directly connected to a target member of the member community; and
apply the trained model to the set of snapshots of the multiple members directly connected to the target member to predict a likelihood of the target member achieving the evolution of the plurality of successful members.

12. The apparatus of claim 11, wherein the memory further stores instructions that, when executed by the one or more processors, cause the apparatus to:
rank the multiple members based on their importance; and
augment the graphical depiction with indicators of a top N important members among the multiple members (N ≥1).

13. The apparatus of claim 12, wherein said ranking comprises:
identifying those members in the multiple members who are one or more of:
an influencer;
a famous person;
a prominent scientist; and
an elected politician at a state level or above.

14. The apparatus of claim 12, wherein said ranking comprises:
determining numbers of followers, among the member community, of M organizations (M ≥1); and
identifying N members among the multiple members associated with the M organizations.

15. The apparatus of claim 12, wherein said ranking comprises:
executing a third-party tool to calculate academic ratings of the multiple members.

16. The apparatus of claim 11, wherein the evolution of the plurality of successful members includes a level of success achieved by the plurality of successful members over the time period.

17. The apparatus of claim 11, wherein predicting the likelihood of the given second member achieving the evolution of the plurality of successful members includes determining if the second set of snapshots exhibits a similar pattern of evolution to the modeled evolution of the plurality of successful members.

18. The apparatus of claim 11, wherein said capturing, over the time period, of the set of snapshots includes taking the set of snapshots at a set of predetermined time intervals.

19. A system for predicting the likelihood of a member's future success in career based on attributes of the member in a social network, the system comprising:
one or more processors;
a graph module comprising a computer readable medium storing instructions that, when executed, cause the one or more processors to:
for each successful member of a plurality of successful members of a member community, wherein each successful member has achieved a predetermined threshold level of success in his/her career,
identify, within a graph of nodes connected by edges, a first node representing the successful member of the member community, the successful member having corresponding attribute values for attributes including one or more of employer, function, and seniority; and
traverse the graph to identify multiple second nodes directly connected to the first node and representing multiple members of the member community directly connected to the successful member and having corresponding attribute values for the attributes; and
a connection insight module comprising a computer readable medium storing instructions that, when executed, cause the system to:
for the plurality of successful members, capture, over a time period, sets of snapshots of the attribute values corresponding to the corresponding multiple members, wherein each snapshot is captured at a given time in the time period according to a predetermined time interval;
train a machine-learning model using the captured sets of snapshots for the plurality of successful members to obtain a trained model for recognizing an evolution of the plurality of successful members;
capture, over another time period, a set of snapshots of attribute values corresponding to multiple members directly connected to a target member of the member community; and
apply the trained model to the set of snapshots of the multiple members directly connected to the target member to predict a likelihood of the target member achieving the evolution of the plurality of successful members.

20. The system of claim 19, wherein the computer readable medium of the connection insight module further stores instructions that, when executed, cause the system to:
rank the multiple members based on their importance; and augment the graphical depiction with indicators of a top N important members among the multiple members (N ≥1).

21. The system of claim 20, wherein said ranking comprises:
identifying those members in the multiple members who are one or more of:
an influencer;
a famous person;
a prominent scientist; and
an elected politician at a state level or above.

22. The system of claim 20, wherein said ranking comprises:
determining numbers of followers, among the member community, of M organizations (M ≥1); and
identifying N members among the multiple members associated with the M organizations.

23. The system of claim 20, wherein said ranking comprises:
executing a third-party tool to calculate academic ratings of the multiple members.

\* \* \* \* \*